May 9, 1950  R. J. GOMEZ  2,506,957
SPATTER PROOF FRYING PAN COVER
Filed July 10, 1948
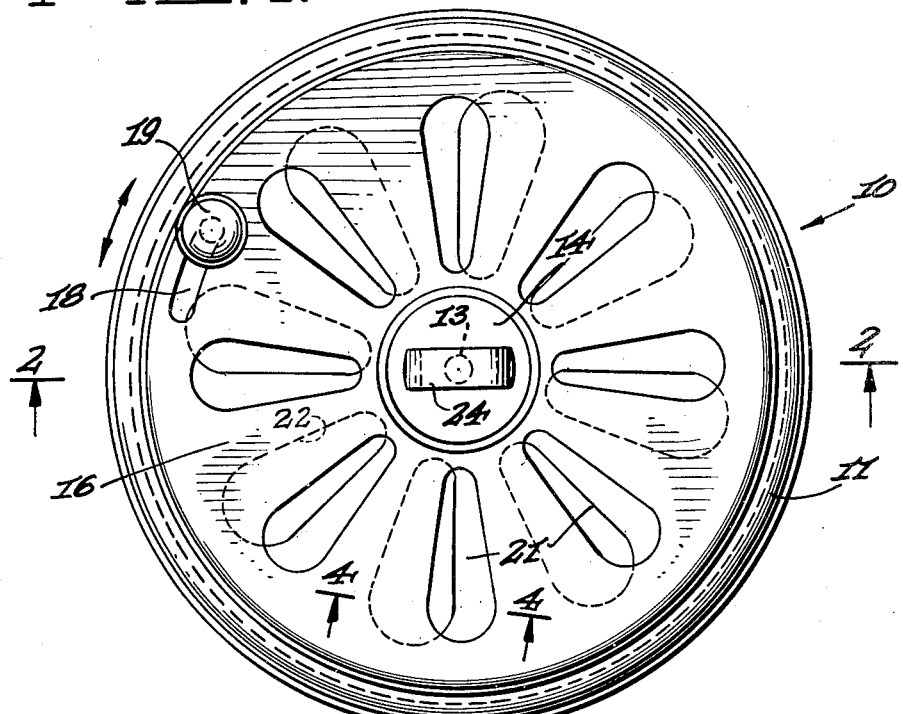
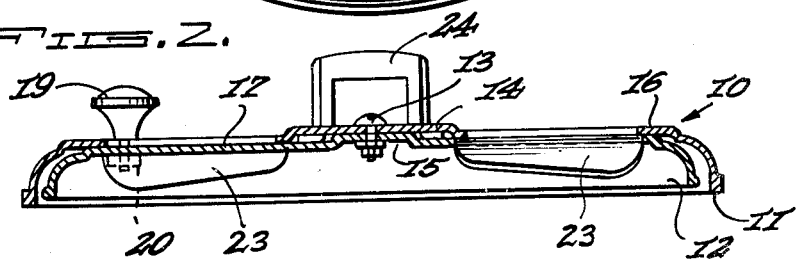
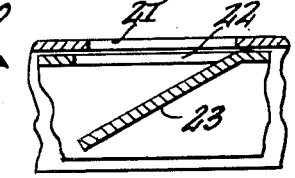 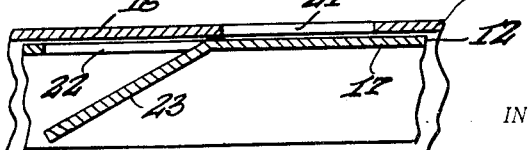
INVENTOR.
R. J. GOMEZ.
BY
J. Ledermann
ATTORNEY.

UNITED STATES PATENT OFFICE 2,506,957

SPATTERPROOF FRYING PAN COVER

Richard J. Gomez, Yonkers, N. Y.

Application July 10, 1948, Serial No. 38,054

1 Claim. (Cl. 220—44)

This invention relates to frying pans, and more particularly aims to provide a novel cover for frying pans whereby spattering grease is prevented from flying out of the pan to settle on the stove or walls while at the same time permitting practically open-pan frying.

The above broad as well as additional and more specific objects will become apparent in the following description, wherein characters of reference refer to like-numbered parts in the accompanying drawing. It is to be noted that the drawing is intended solely for the purpose of illustration, and it is therefore neither desired nor intended to limit the invention necessarily to any or all of the exact details of construction shown except insofar as they may be deemed essential to the invention.

Referring briefly to the drawing, Fig. 1 is a plan view of a frying pan cover embodying the instant invention.

Fig. 2 is a sectional view taken on the line 2—2 of Fig. 1.

Figs. 3 and 4 are both sectional views taken on the line 4—4 of Fig. 1, the former showing the under-cover in position wherein its slots are in alignment with the slots through the upper cover, and the latter showing the lower cover shifted into position wherein the said slots are out of alignment and hence closed.

Referring in detail to the drawing, the numeral 10 indicates the entire or combination frying pan cover which is composed of the upper cover 11 and the lower cover 12. The latter is of smaller diameter than the former, and is rotatably secured to the former by means of a pivot 13 passing through the boss-like co-axial mid-sections 14 and 15 of the two component covers 11 and 12, respectively. These bosses rise from the disc-shaped roofs 16 and 17, respectively, of the cover members 11 and 12.

An arcuate slot 18, co-axial with the pivot 13, is provided through the top cover 11, that is, through the roof 16 thereof. A downwardly tapering upright member or grip 19 has its lower end passing through the slot 18 and screwed into the roof 17 of the lower cover 12, being removably retained therein by a nut 20.

The roof 16 of the top cover member 11 is provided with a plurality of circumferentially spaced radial slots 21, preferably having the outline shown, that is, tapering toward the center of the roof. The under-cover 12 has a like number of similarly spaced radial openings 22 therethrough, of substantially the same outline but, as shown, of slightly larger dimensions than the slots 21. The roof 17, however, is provided with flat baffles 23 extending angularly downward, substantially as shown, each baffle being contiguous with a longitudinal edge of its opening 22. Thus, at any given cross-section such as the section 4—4 of Fig. 1, the horizontal projection of the baffle 23 is of greater width than the width of the corresponding slot 21, as clearly shown in Fig. 3. As a consequence, any grease which flies directly upward is barred by the baffle from access to the opening 21 above the baffle. A cover handle 24, in the form of a yoke, is rigid on the boss 14 of the top cover member 11.

The circumferential length of the arcuate slot 18 is just sufficient to swing the lower cover member 12 between the extreme positions shown in Figs. 3 and 4, that is, as shown in Fig. 3, with the openings 21 and 22 in alignment, and, as shown in Fig. 4, with the said openings out of alignment thus making the cover 10 the equivalent of the ordinary solid cover. The lower cover 12 may of course occupy any position between the said extremes with respect to the upper cover 11, so that the degree of opening or the total area of passage between and through the two members 11 and 12 may be regulated as desired.

When it is desired to do "open pan" frying with the cover 10, the two cover members 11 and 12 are positioned, with respect to each other, as shown in Fig. 3, in which case the interior of the pan will have ample ventilation yet the baffles 23 will intercept a large portion, if not all, of the spattering grease. The degree of this ventilation, as stated above, may be controlled by rotating the cover 12 by means of the grip 19 to partly disalign the openings 21 and 22, as desired.

Obviously modifications in form or structure may be made without departing from the spirit or scope of the invention.

I claim:

A frying pan cover comprising an upper cover member and a lower cover member of smaller diameter than said upper member, means pivotally joining said members on a common axis, said upper member having a plurality of circumferentially spaced radial slots therethrough, said slots tapering toward the center of said upper member, said lower member having a like number of similarly spaced radial openings therethrough, said radial openings being of slightly larger dimensions than said slots, means for rotating said lower member through an arc with respect to said upper member between two extreme positions, said openings being in alignment with said slots in one of said extreme positions and being out of alignment with said slots in the other of said extreme positions, said lower cover having flat baffles extending downwardly at an acute angle from edges of said openings and under said openings, each of said baffles extending from a contiguous longitudinal edge of its said openings, the width of each of said baffles at every transverse cross-section through baffle and its corresponding slot in the upper cover exceeding the width of said corresponding slot by an amount such that when said covers are mutually so positioned as to position said contiguous edge of an opening in vertical alignment with the corresponding edge of said corresponding slot the area of said corresponding slot lies within the area of a horizontal projection of the said baffle.

RICHARD J. GOMEZ.

REFERENCES CITED

The following references are of record in the file of this patent:

UNITED STATES PATENTS

| Number | Name | Date |
| --- | --- | --- |
| 470,546 | Cone | Mar. 8, 1892 |
| 554,343 | Johnson et al. | Feb. 11, 1896 |
| 616,883 | Bowers | Jan. 3, 1899 |
| 966,946 | McGill | Aug. 9, 1910 |
| 1,414,540 | Young | May 2, 1922 |
| 2,348,507 | Wells | May 9, 1944 |